(12) United States Patent
Mondello et al.

(10) Patent No.: US 7,951,049 B2
(45) Date of Patent: May 31, 2011

(54) TRAINING AID FOR BICYCLES AND BICYCLE TOY

(76) Inventors: Edward Mondello, Wilmington, NC (US); Lisa Salines-Mondello, Wilmington, NC (US)

( * ) Notice: Subject to any disclaimer, the term of this patent is extended or adjusted under 35 U.S.C. 154(b) by 0 days.

(21) Appl. No.: 11/732,790

(22) Filed: Apr. 4, 2007

(65) Prior Publication Data

US 2007/0238585 A1    Oct. 11, 2007

Related U.S. Application Data

(60) Provisional application No. 60/791,551, filed on Apr. 11, 2006.

(51) Int. Cl.
    *A63B 69/16* (2006.01)
(52) U.S. Cl. .......................................... 482/57; 280/221
(58) Field of Classification Search .................... 482/57; 280/210, 214, 220, 221, 259, 260, 261, 270, 280/282, 287, 288.1, 288.2, 288.3, 287.01, 280/287.021, 291; 296/17; 446/440, 465, 446/467–470
    See application file for complete search history.

(56) References Cited

U.S. PATENT DOCUMENTS

| | | | | | |
|---|---|---|---|---|---|
| 1,296,977 | A | * | 3/1919 | Leonard | 280/87.05 |
| D53,215 | S | * | 4/1919 | Bennett | D21/427 |
| 1,308,526 | A | * | 7/1919 | McLaren | 280/87.05 |
| 1,326,468 | A | * | 12/1919 | Shearer | 280/240 |
| D144,043 | S | * | 3/1946 | Elliott | D21/433 |
| D157,322 | S | * | 2/1950 | Baretta | D12/111 |
| D191,176 | S | * | 8/1961 | Pressner | D21/424 |
| 3,039,791 | A | * | 6/1962 | Horowitz et al. | 280/259 |
| 3,352,570 | A | * | 11/1967 | Cordrey | 280/282 |
| 3,432,164 | A | * | 3/1969 | Deeks | 482/51 |
| 3,827,719 | A | * | 8/1974 | Lohr et al. | 280/259 |
| 3,863,950 | A | * | 2/1975 | Jordan | 280/218 |
| 3,874,700 | A | * | 4/1975 | Lohr et al. | 280/240 |
| 3,907,331 | A | * | 9/1975 | Lohr et al. | 280/270 |
| 3,954,283 | A | * | 5/1976 | Boehm et al. | 280/273 |
| 4,079,957 | A | * | 3/1978 | Blease | 280/278 |
| 4,401,315 | A | * | 8/1983 | Pavincic | 280/259 |
| 4,596,301 | A | * | 6/1986 | Nagashima | 180/215 |
| 4,596,398 | A | * | 6/1986 | Grossi | 280/282 |
| 4,621,826 | A | * | 11/1986 | Ziegler, Jr. | 280/259 |
| 4,828,285 | A | * | 5/1989 | Foret et al. | 280/279 |
| 4,925,200 | A | * | 5/1990 | Jones | 280/233 |
| 5,201,538 | A | * | 4/1993 | Mayn | 280/288.1 |

(Continued)

OTHER PUBLICATIONS

Advertisement for "Like a Bike".

(Continued)

*Primary Examiner* — Loan Thanh
*Assistant Examiner* — Daniel F. Roland
(74) *Attorney, Agent, or Firm* — Michael E. Mauney

(57) ABSTRACT

A training toy and exercise device. A large frame supports a rear wheel and a front wheel. The front wheel is mounted in sized openings in the frame and is controlled by a handle bar. There are no pedals, chains, cranks controlling the operation of the device. A user will sit on the seat and use the user's legs to propel oneself unless the user is coasting. Under those circumstances the user's legs will rest on pegs. The device will find its primary use as a toy for small children who have not yet learned to ride a bicycle. Using this device a child can learn to ride a bicycle and balance himself on a two wheeled vehicle without concern for falling since at anytime the child's legs readily reach the ground given the vehicle's small size and low center of gravity.

1 Claim, 3 Drawing Sheets

U.S. PATENT DOCUMENTS

| | | | |
|---|---|---|---|
| 5,549,313 A * | 8/1996 | James et al. | 280/221 |
| 5,553,879 A * | 9/1996 | Niemeyer et al. | 280/279 |
| 5,556,116 A * | 9/1996 | Sloss et al. | 280/7.15 |
| 5,829,772 A * | 11/1998 | Jones | 280/234 |
| 6,010,140 A * | 1/2000 | Guynn | 280/291 |
| 6,450,516 B1 * | 9/2002 | Nall, III | 280/87.021 |
| 6,588,787 B2 * | 7/2003 | Ou | 280/287 |
| 6,601,862 B2 * | 8/2003 | Kettler | 280/231 |
| 7,150,339 B2 * | 12/2006 | Liao et al. | 180/221 |
| 7,413,207 B2 * | 8/2008 | Yu | 280/279 |
| 7,445,224 B2 * | 11/2008 | Whyte | 280/278 |
| 2001/0035626 A1 * | 11/2001 | Kettler | 280/282 |
| 2003/0132592 A1 * | 7/2003 | Dombroski | 280/87.01 |
| 2003/0141694 A1 * | 7/2003 | De Oliveira | 280/281.1 |
| 2007/0052198 A1 * | 3/2007 | Kelly | 280/259 |
| 2007/0108726 A1 * | 5/2007 | Schloegel | 280/288.4 |
| 2008/0277901 A1 * | 11/2008 | Catelli et al. | 280/287 |

OTHER PUBLICATIONS

Advertisement for "Kettler Sprint".

* cited by examiner

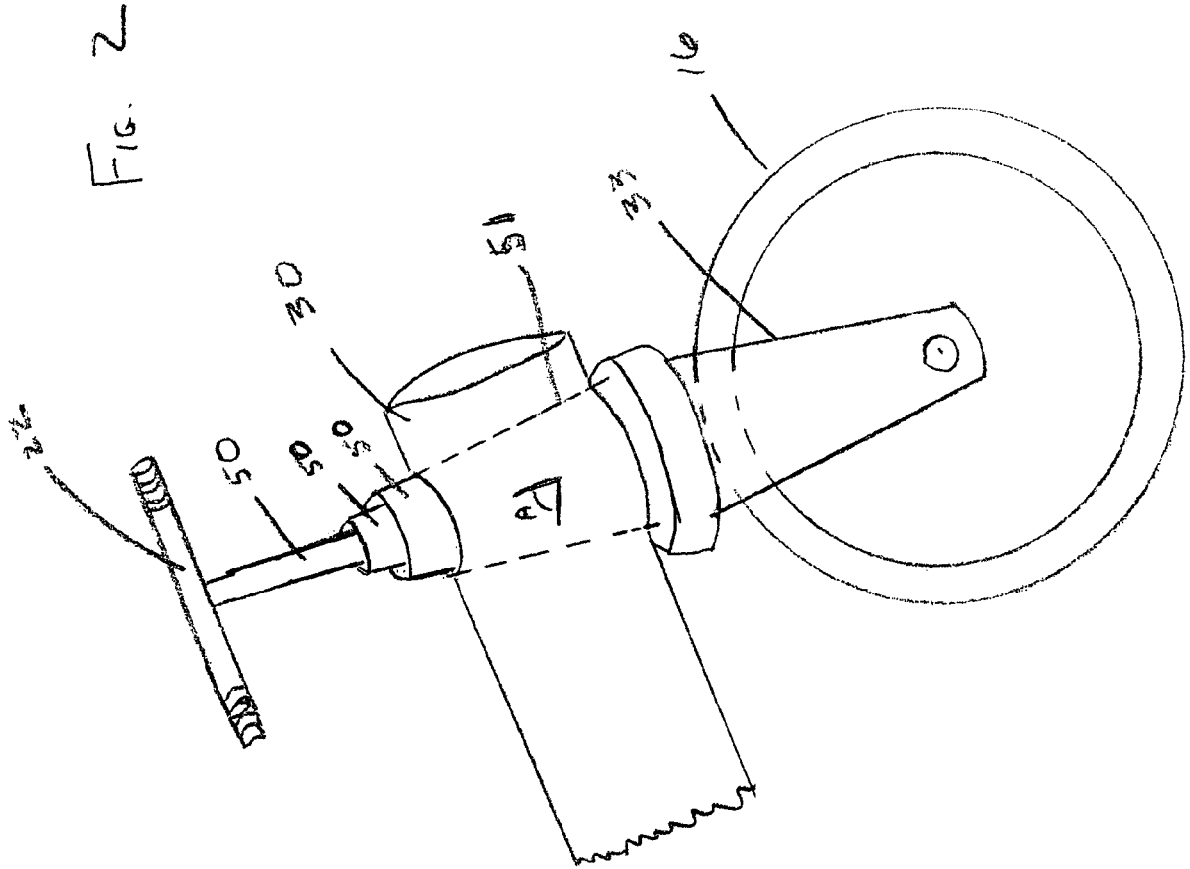

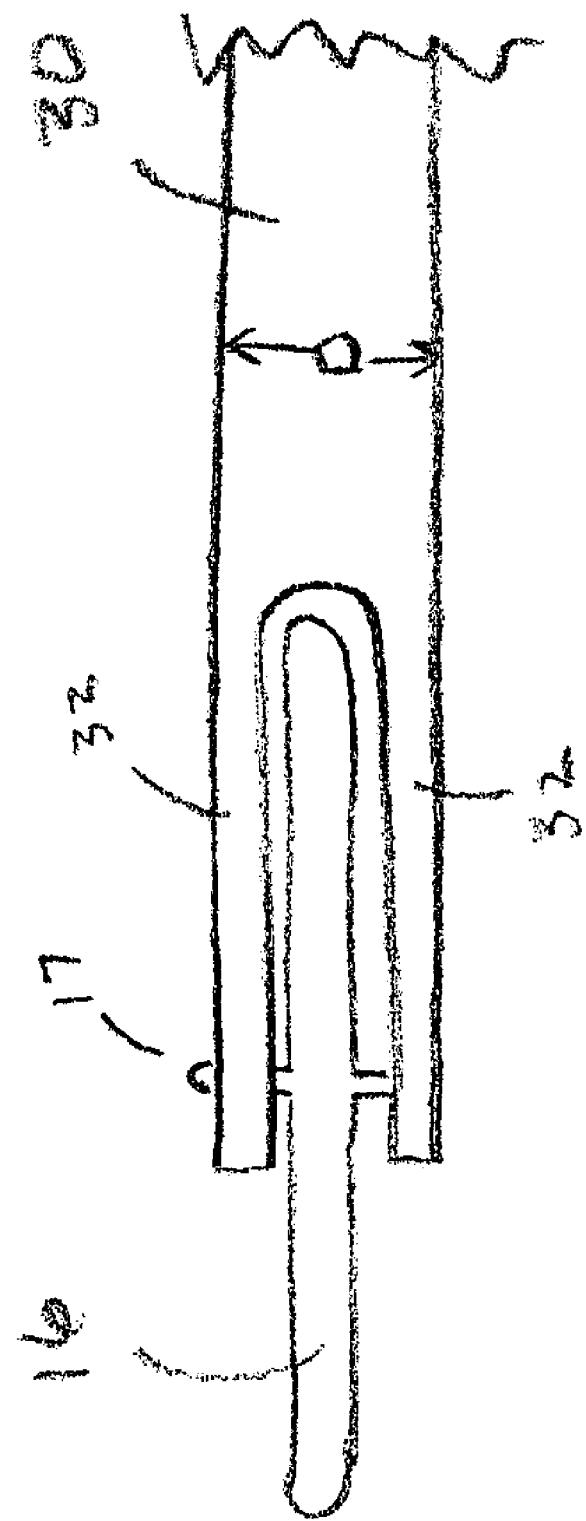

TRAINING AID FOR BICYCLES AND BICYCLE TOY

RELATED APPLICATIONS

This application claims benefit of a provisional application Ser. No. 60/791,551 filed 11 Apr. 2006.

FIELD OF THE INVENTION

This invention relates generally to devices used to train small children in the proper procedures and balance for riding a two-wheel vehicle like a bicycle and for bicycle style toys.

BACKGROUND OF THE INVENTION

For well over a century, a bicycle has been a mode of transportation used both by adults and children. However, for adults, a bicycle may be a transportation of choice, not of necessity. However, for many children, a bicycle is the only way to go from place to place other than walking. Bicycles are largely stereotypical in their construction and operation. Ordinarily, there are two tires connected by a frame. The motive power is provided by the rider using pedals, crank, sprockets, and a chain mechanism that allows the user to push the pedals in a largely straight line or slight arc-like motion. The crank, chain, and sprockets translate this straight line motion into a circular motion, which is then applied to the rear wheel of the bicycle to cause it to rotate, hence moving the bicycle along a path chosen by the rider. The rider steers using the front wheel with a handle bar, mounted in a pivoting relationship with the frame and the front wheel. A bicycle is not self-balancing—that is, if one places a bicycle in an upright position and removes support from the bicycle, it will fall on its side. Consequently, the act of learning to ride a bicycle is a relatively complex one. It requires that a user control the steering of the bicycle, pedal the bicycle, all while maintaining the user's balance on the bicycle. While not unduly difficult to learn, it is a process that takes some time and may result in some falls, or even injuries, to a user. Consequently, the standard method of teaching riding a bicycle involves a parent or other person standing nearby or touching the beginning rider who is placed on the seat of the bicycle and the pedals. The supervising individual holds the rider upright and the rider learns to pedal and steer while receiving support from the individual. At some point, the support is removed and it is hoped that the rider is then able to balance and steer the bicycle.

However, "training wheels" are another training expedient sometimes employed. This training device consists of two wheels which are temporarily mounted on the rear bicycle axle and extend outwardly from the rear wheel to provide extra support, substituting for the extra support provided by a supervising individual as described above. However, as with many temporary expedients, this is not entirely satisfactory. The training wheels have to be installed on an existing bicycle. They are not entirely effective at preventing a fall or a wreck on a bicycle when in use and they have a certain stigma attached to them for the child who may be learning to ride using training wheels.

Part of the problem that arises with a regular bicycle when used for training is caused by the function of the bicycle. In order for an individual to be able to effectively pedal the bicycle, the pedals need to be a certain distance from the seat, so that as a person is making the pedaling motion, the legs come close to fully extending. If the legs are unduly bent or cramped, it reduces the power available for the pedaling stroke. Consequently, if the seat is mounted at the proper height on a bicycle, a user is ordinarily not able to place both feet on the grounds at the same time without dismounting from the seat. Consequently, for an inexperienced user on a regular bicycle, if the bicycle begins to tip, the tipping may reach an uncontrollable point before the user is able to transfer their feet from the pedals to the ground to provide support. Adding training wheels to a conventional bicycle does nothing to overcome this problem.

Another mode of transportation is a two wheel scooter. This differs from a bicycle in that the mode of power is provided by the legs of the user pushing along the ground. When using a scooter, a user stands on a flat panel supported at each end by the scooter wheels. Usually the front wheel pivots for steering. Unlike a bicycle, a scooter user stands when in use rather than sitting on a seat as is the case with a bicycle. Scooters are usually used on flat ground and for travel over short distances. However, their utility is limited for people who have balance problems or people who, for some reason, may need to rest their weight on a seat when not using their legs for motive power.

SUMMARY OF THE INVENTION

This invention is designed to overcome the drawbacks of previous prior art. It is designed for one use as a training aid to be used by a small child who is in the process of learning to ride a conventional bicycle and for use as a toy. It will teach the skills required to ride a bicycle but do so in a fashion that will allow the user to make use of the device while unsupervised with little or no risk of fall or injury to the user. It is designed to be simple in construction, to be adjustable to different sized users, and to be handed down in families who have more than one child. The current invention is designed to be simple and inexpensive in construction to make it practical for families to buy solely as a training aid or for a short time use toy for a small child. It is designed to allow a child to coast on a slight down hill or incline using the bicycle-like toy with the legs resting on the fixed foot pegs or to use the legs to push the device along the ground. The device is designed to allow the seat on the device to be adjusted so that a user can comfortably place both feet on the ground at the same time, increasing the user's confidence that he or she can avoid a fall, while also allowing a user to use their feet to push the bicycle-like toy device along the ground. The main frame of the device is designed to make it easier for a user to use the bicycle while also providing a lower likelihood of injury in the event of an accident. The main frame of the device is ordinarily made of a plastic PVC material in the basic form of a tube approximately four inches in diameter. This allows the front wheel to pivot on an appropriately designed mount without the requirement of a headset for the front wheel mount in connection to the handle bars. It also provides a convenient and simple way of mounting the rear wheel without the necessity of separate tubes or separate construction.

As a second use, this device may also be used by the elderly or the infirm in lieu of a scooter for transportation over short distances or for exercise. Unlike a scooter, a user may utilize the seat on this device to support his weight and use the legs to provide balance and motive power. It reduces the likelihood of balance problems that might come with the use of a scooter. It can be used in the same places where a scooter might provide short distance transportation or it can be used as a rehabilitation exercise device for people in need of particular types of rehabilitation. These and other advantages of the

BRIEF DESCRIPTION OF THE DRAWINGS

FIG. 2 shows a detailed view of the handle bars and front fork.

FIG. 3 shows a detailed view of the rear wheel seen from above.

DETAILED DESCRIPTION OF THE DRAWINGS

Figure 1:
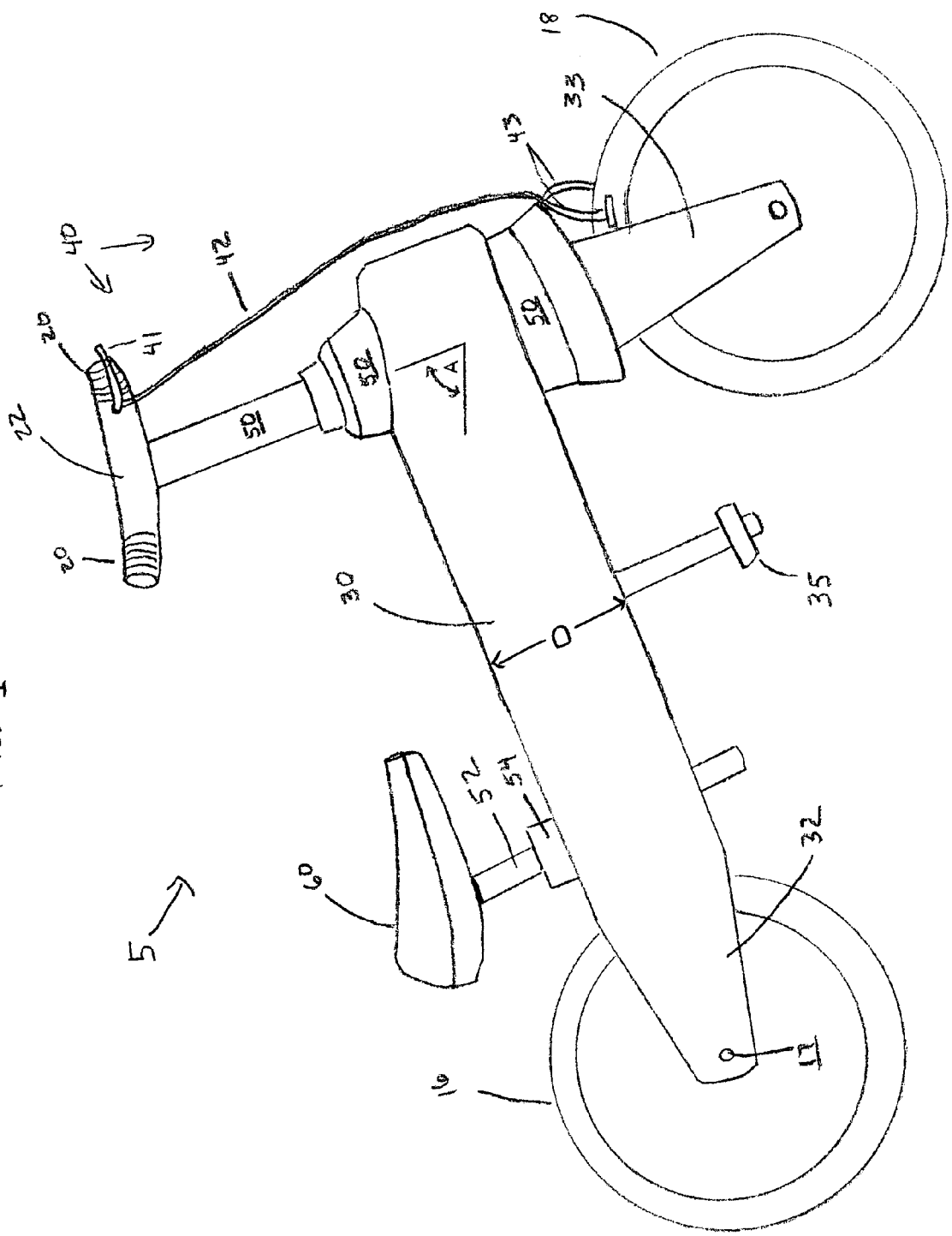
FIG. 1 shows the training and exercise bike.

FIG. 1 shows the training and exercise bike (5). Unlike conventional bicycles, there are no chains and sprockets. Consequently, instead of pedal there are foot rests which are essentially pegs (35). The user will sit on the seat (60) resting at their feet on the foot pegs (35) placing their hands on the grips (20) on the handlebar (22). The seat (60) is adjustable using the seat post (52), which fits in an opening in the seat mount (54) for vertical adjustment within the main frame (30). There is a front wheel (18) and a rear wheel (16). These are ordinarily the same size. The front wheel (18) has a brake assembly (40) of conventional design, including a hand brake (41) mounted on the handle bar (22), which attaches to a cable (42) then to the brake calibers (43). Certain features should be noted regarding the main frame (30). It is ordinarily constructed of a tubular, durable non-corrosive plastic material such as PVC. Unlike conventional bicycle frames, which tend to be made of metal tubing and relatively small size in order to make the frame lighter, here the tubing ordinarily will be four inches in diameter. This provides several important advantages. First, the rear wheel (16) is not mounted on a rear fork assembly as is common in conventional bicycles. The conventional bicycle rear fork assembly is both complex and expensive. The training and exercise bicycle (5) does not use the chain drive mechanism. For this reason the mounting of the rear wheel (16) is greatly simplified. The frame (30) has a diameter (D) large enough to allow a slot to be cut from the main frame (30) for receipt of the wheel (16) which is mounted to the two sides of the frame (30) by a fixed axle (17). At the center of the rear wheel (16) will be an appropriate roller bearing, which will allow the wheel (16) to freely rotate. The above described construction both greatly simplifies the fabrication and reduces the cost of the training and exercise bike (5) and is a departure from known frames for two-wheel bicycle-like vehicles. Another simplification in design is for the handle bars (22), which control the front fork (33). This is shown in more detail in FIG. 2. The handle bars (22) and front fork (33) are mounted at an angle (A) to the main frame (30). The angle (A) in the preferred embodiment is 66°. This design feature again departs from conventional bicycles, in which handle bars are ordinarily mounted at a more upright angle, typically, 71°. This smaller angle (A) lowers the center of gravity of the training and exercise bicycle (5), which makes it easier for a neophyte user to control. It also slows the turning reaction to make the training and exercise bike (5) less responsive to turning motions of the handle bars (22). Again, this makes it easier to control for neophyte users. The main frame (30) is constructed of a durable, non-corrosive plastic PVC material, circular in cross section and four inches in diameter. This large diameter makes it possible to mount the handle bars (22) and hand grips (20), as is shown in FIG. 2, and to use the rear fork (32) to simplify the fabrication of the device, but also provides safety advantages. Should a user, who is spraddling the main frame (30), fall on the main frame (30), the large diameter of the frame (30) distributes the force more diffusely and reduces the risk of injury to a user.

FIG. 2 shows in more detail how the handle bar (22) is mounted on the main frame (30). The steering bar (50) consists of telescope-like construction of durable circular pipe material, preferably polyvinyl chloride of differing diameters. The diameters increase from the handle bar (22) as the steering bar (50) extends to the front wheel (16). This means that because the force exerted by a user is downward on the front wheel (16), the frame (30) is seated on the steering bar (50) by the weight of a user because it is a cone-like portion (51) of the steering bar (50), which is in contact with the main frame (30). It means the main frame (30) will slide downward on the cone-like portion (51) of the steering bar (50) until it is fixed in place. Then it will rest in mounting position and remain there by the force of gravity. However, because of the size of the steering bar (50) and of the low coefficient friction of between the pieces of PVC plastic that are employed, it is not necessary that a head set or bearings be employed. This means that the steering bar (50) can be simply slipped into place, then the handle bar (22) mounted on the top of the steering bar (50), simplifying both assembly and the cost of the training bicycle (5)

FIG. 3 shows the wheel end (32) of the frame (30) seen from above. The diameter (D) of the frame (30) is large enough to accommodate a slot cut into the frame (30) making it a simple matter to mount the rear wheel (16) on a fixed axle (17) connected to each side of the rear wheel end (32) of the frame (30). This eliminates the need for complicated chain, gear, drives, and cable connections and the like all of which greatly complicate the construction and manufacture of the rear wheel mounting of a conventional bicycle.

The training and exercise bike (5) is readily used by small children, both as a toy and as a readily and easily controlled means of transport to cover distances over level ground or ground with slight inclines. It teaches a small child the skills necessary to balance and steer the device while the child's feet are resting on the foot pegs (35). It can be used like a scooter for travel over short distances. It can also be used by the elderly or the infirm who for balance reasons may not be able to use a scooter or standard bicycle. It can provided a stable way of exercising one's legs without the necessity of the legs supporting the weight of the user which rests on the seat (60). The low center of gravity of the device along with the adjustable seat make it convenient and easy to use for people of different sizes.

We claim:

1. A bicycle-like toy, transportation, and training device which is propelled by a user pushing the device along the ground without using a pedal mechanism for driving a rear wheel of said bicycle-like toy, transportation, and training device comprising:
    (a) a generally cylindrical, with a definite crossectional diameter, frame;
    (b) at a first rear wheel end of said frame a slot in said frame for mounting a rear wheel;
    (c) a rear wheel mounted in said slot at said first rear wheel end of said frame;
    (d) a seat adjustably mounted by a seat mounting bar, said seat mounting bar substantially parallel to a front wheel and steering assembly, in said frame proximal to said first rear wheel end said seat adjustably mounted whereby a user may adjust said seat so a user's legs will comfortably reach the ground so a user may propel the bicycle-like toy, transportation, and training device along the ground and without readjusting said seat a user, when coasting, may place feet on foot pegs;

(e) said front wheel and steering assembly mounted on said frame at a definite angle said definite angle constrained so that said front wheel and steering assembly is at an angle of less than 70° to a horizontal line thereby lowering the center of gravity of said device and increasing the stability of said device and said steering assembly is mounted inside a first and second opening in said frame, said first and second opening sized for receipt of said steering assembly whereby said steering assembly is generally tube like and rotates inside of said first and second opening in said frame;

(f) on ground side of said frame a foot peg mounting bar, said foot peg mounting bar substantially parallel to said front wheel and steering assembly and substantially parallel to said seat mounting bar and extending from said frame toward the ground;

(g) said foot pegs comprising a first left side fixed foot peg and a second right side fixed foot peg, each mounted on a ground side end of said foot peg mounting bar and substantially perpendicular to said foot peg mounting bar whereby a user may place a left foot on said first left side fixed foot peg and a right foot on said second right side fixed foot peg;

whereby said seat mounting bar, said foot peg mounting bar, and said steering assembly are in a substantially parallel relationship so as to provide a lower center of gravity to facilitate a user propelling himself along the ground using feet and alternately coasting while feet are on said foot pegs.

* * * * *